United States Patent
Nath

(10) Patent No.: US 6,302,746 B1
(45) Date of Patent: Oct. 16, 2001

(54) DISTRIBUTOR WITH INLINE BLOCKSHAPED INLINE CONNECTOR COMPONENTS

(75) Inventor: Torsten Nath, Berlin (DE)

(73) Assignee: RXS Kabelgarnituren GmbH, Hagen (DE)

( * ) Notice: Subject to any disclaimer, the term of this patent is extended or adjusted under 35 U.S.C. 154(b) by 0 days.

(21) Appl. No.: 09/380,987
(22) PCT Filed: Mar. 11, 1998
(86) PCT No.: PCT/DE98/00719
 § 371 Date: Sep. 13, 1999
 § 102(e) Date: Sep. 13, 1999
(87) PCT Pub. No.: WO98/41035
 PCT Pub. Date: Sep. 17, 1998

(30) Foreign Application Priority Data

Mar. 13, 1997 (DE) .............................. 197 10 479

(51) Int. Cl.[7] ................................................. H01R 11/09
(52) U.S. Cl. ............................................................. 439/719
(58) Field of Search ..................................... 439/719, 715

(56) References Cited

U.S. PATENT DOCUMENTS 4,712,232 * 12/1987 Rodgers ............................... 439/719

FOREIGN PATENT DOCUMENTS 20 48 104 B2    4/1972   (DE) .
  3836668   *  8/1990   (DE) .

* cited by examiner

*Primary Examiner*—Neil Abrams
(74) *Attorney, Agent, or Firm*—Schiff Hardin & Waite

(57) ABSTRACT

A distributor has a base bent to form a front face and side surface by the front surface and has space apart connection components for connecting single wires with a guide element between adjacent components which element is bent to engage both the front face and the side surface. The distributor also includes special connecting components, for holding plug connectors for coaxial conductors or optical conductors which components have a curved configuration to engage both the front face and side surface of the distributor.

4 Claims, 2 Drawing Sheets

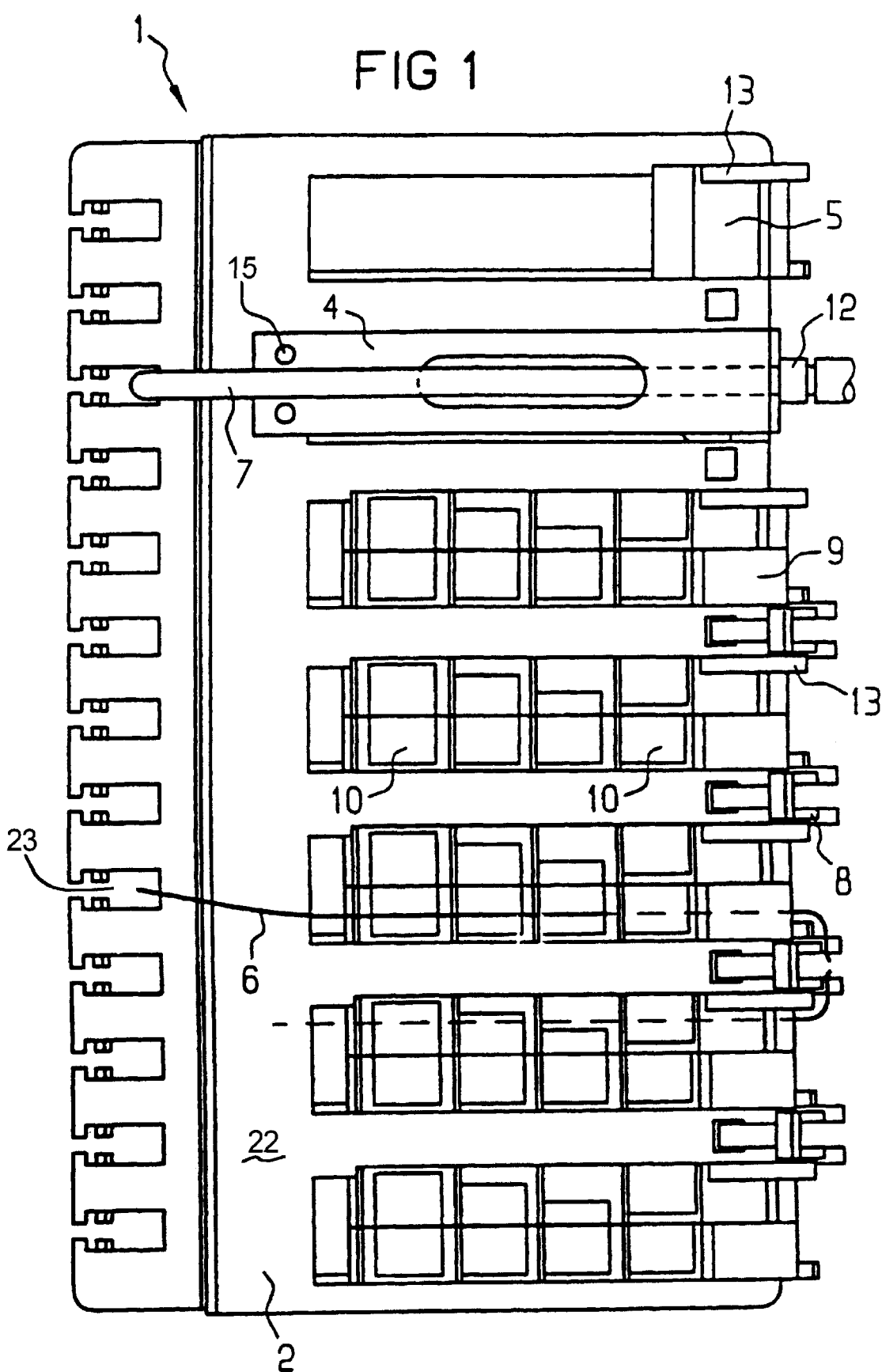

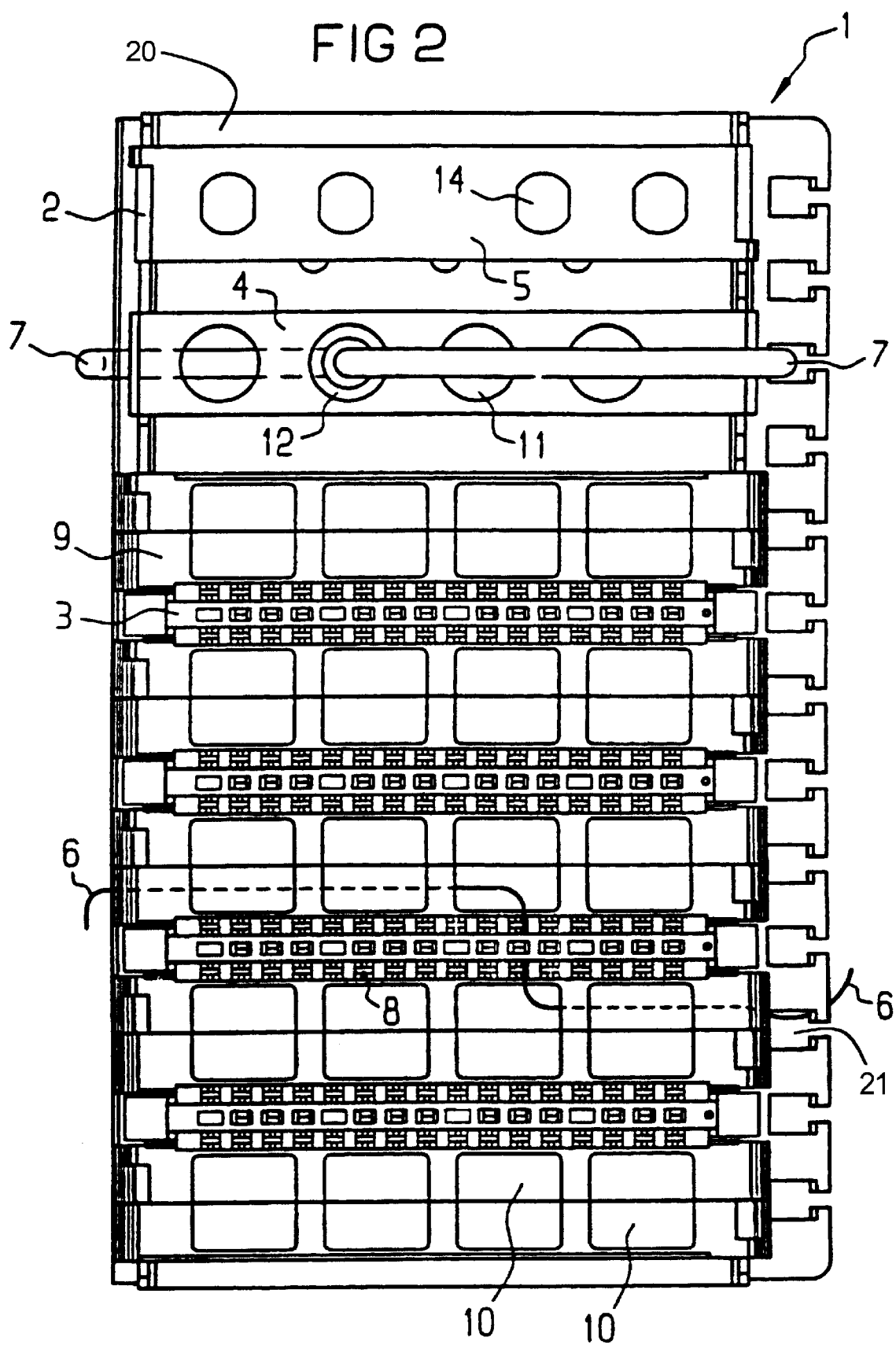

DISTRIBUTOR WITH INLINE BLOCKSHAPED INLINE CONNECTOR COMPONENTS

BACKGROUND OF THE INVENTION

FIELD OF THE INVENTION

The present invention relates to a distributor device with connecting components arranged in a row, like a block, for incoming and outgoing lines of a telecommunications system. Such distributor device has a base for the connecting components which is provided with installation slots for guide elements that are arranged between the connecting components and in which the lines can be routed to connecting points arranged at the front of the connecting components.

DESCRIPTION OF THE PRIOR ART

Such a device generally has been disclosed, for example, in DE 20 48 104 Cl. It is normal for such guide elements to be designed as separate wire guides in which wire guide channels that are curved in the form of an arc run from the front face of a distributor block to the adjacent side walls. It is possible to route the incoming and outgoing lines through the wire guide channels to the associated connecting elements of contact components on the front face, wherein one wire guide and one contact component in each case alternately are stacked one above the other in the distributor block. Insulation-displacement terminals are used as the connecting elements to which the single, insulated two-core copper lines are connected.

Modern telecommunications devices increasingly use lines for relatively high frequencies, which require different connecting elements. The present invention is based on the object of routing different types of lines via the distributor and connecting them to one another. This object is achieved by the invention as claimed in claim 1.

SUMMARY OF THE INVENTION

The special lines are, for example, in the form of coaxial lines or optical conductors which are connected to one another, for example, via plug connecting elements. Such connecting elements require more installation space than, for example, conventional insulation-displacement terminals. The present invention makes it possible to broaden the installation space for the special components to such an extent that even relatively thick plug connector elements for coaxial conductors can be accommodated. This is possible by virtue of the fact that the thickness of the wire guide elements is considerably greater than that of the conventional connecting components for lower-frequency lines.

In an embodiment the installation space for special components is allowed to be expanded even more.

In an embodiment openings in the base are allowed to be largely covered and to be electromagnetically shielded.

In an embodiment the sheet-metal part is allowed to largely cover side openings in the base as well.

In an embodiment, the plastic body may be in the form of a cost-effective injection-molded part wherein holders for the connecting elements can be formed in a manner which is advantageous for assembly. In particular, it is advantageous for the plastic bodies to be fitted with retaining elements which are compatible with those of the guide elements. This allows the plastic bodies to be latched in a simple manner to the base for the connecting components.

Additional features and advantages of the present invention are described in, and will be apparent from, the Detailed Description of the Preferred Embodiments and the Drawings.

DESCRIPTION OF THE DRAWING

FIG. 1A shows a side view of a distributor device 1 like a block, in accordance with the teachings of the present invention; and FIG. 2 shows a front view of the distributor device shown in FIG. 1.

DETAILED DESCRIPTION OF THE PREFERRED EMBODIMENTS

According to FIGS. 1 and 2, a block-like distributor device has a base 2 which is bent from sheet metal to form a front face 20 with installation slots 21 (see FIG. 2) and a side surface 22 (see FIG. 1) with installation slots 23. The base 2 has connecting components 3 for connecting or joining incoming and outgoing lines 6, and has special components 4 and 5 for holding special lines 7.

The connecting components in the lower part of FIGS. 1 and 2 are in the form of narrow contact components 3 on the front face 20. Such contact components 3 are provided with a double row of insulation-displacement terminals 8 for the connection of incoming and outgoing lines which are in the form of a single copper line or wire 6. A guide element 9 for the copper lines or wires 6 is provided between, in each case, two adjacent contact components 3. Such guide element 9 is provided with openings or apertures 10 and channels which run, for example, in the form of curves and in which the copper lines 6 are routed from the side surface 22 of the distributor device 1 which are adjacent to the front face 20 to the associated insulation-displacement terminals 8 of the contact components 3 on the front face 20. The incoming and outgoing wires 6 may be received in the slots 21 and 23.

According to the upper part of the illustration, the special components 4, 5 are attached to the base 2 instead of the guide elements 9 and are used for the connection of incoming and outgoing lines which are in the form of special lines 7 which are engaged in slots 21 and 23. Such lines may be, for example, in the form of coaxial conductors or optical conductors. One of the special components 4, 5 is in the form of a cover-like sheet-metal part 4, which has apertures 11 for the attachment of connecting elements 12 in the form of plug connectors, via which the special lines 7 are connected to one another. The sheet-metal part 4 is bent in a U-shape and engages both the front face 20 and the adjacent side surface or wall 22 of the base 2. The sheet metal part 4 is held on the base 2 by means of screw-like attachment elements 15.

A further special component in this case is in the form of a strip-like plastic body 5, which is attached to the base 2 by means of retaining elements 13 such as latching hooks. Such retaining elements 13 are also fitted to the guide elements 9 and are designed to be mutually compatible. In consequence, it is possible to use guide elements 9 and plastic bodies 5 alternately at any desired installation points in the distributor device 1. The plastic body 5 is provided with holders 14 for insertion of the connecting elements 12.

Although the present invention has been described with reference to specific embodiments, those of skill in the art will recognize that changes may be made thereto without departing from the spirit and scope of the invention as set forth in the hereafter appended claims.

What is claimed is:

1. A distributor device for a telecommunication system comprising a base having a front face and at least a side surface, a plurality of spaced apart connector components being arranged in a row on the front face for incoming and outgoing lines of the telecommunication system, a plurality of guide elements being arranged between the connector components and extending for engagement on the side surface for guiding lines being routed to connecting point on the connector components, and at least one special component for holding connecting plugs of special lines selected from coaxial conductors and optical conductors, said special component being disposed on the base with a portion engaging the front face and another portion engaging the adjacent side surface.

2. The distributor device according to claim 1, wherein the special component is a cover-like sheet metal part having apertures for holding the connecting plugs for the special lines.

3. The distributor device according to claim 2, wherein the special component is fixed by screw-like attachment elements.

4. The distributor device according to claim 1, wherein the special component is a strip-like plastic body which includes retaining elements for attaching the body to the base, said guide elements having retaining elements compatible with the retaining elements of the strip-like plastic body.

* * * * *